May 21, 1940. E. E. KOE Re. 21,459

FORM MEASURING DEVICE

Original Filed April 4, 1933 3 Sheets-Sheet 1

Inventor
Emil E. Koe
John F. Brezina
Atty.

May 21, 1940. E. E. KOE Re. 21,459

FORM MEASURING DEVICE

Original Filed April 4, 1933 3 Sheets-Sheet 2

Inventor
Emil E. Koe
John F. Brezina
Atty.

FORM MEASURING DEVICE

Original Filed April 4, 1933 3 Sheets-Sheet 3

Inventor
Emil E. Koe
John H. Bregina
Atty.

Reissued May 21, 1940

Re. 21,459

UNITED STATES PATENT OFFICE 21,459

FORM MEASURING DEVICE

Emil E. Koe, Berwyn, Ill.

Original No. 1,976,174, dated October 9, 1934, Serial No. 664,428, April 4, 1933. Application for reissue July 9, 1937, Serial No. 152,766

3 Claims. (Cl. 33—7)

This invention is a new and useful improvement in means for measuring the contours of the human body for clothing and has other and incidental uses for measuring any surface, particularly an inclined surface.

The principal object of the present invention is to provide a device to measure a form utilizing a substantially arcuate tube containing a liquid, the liquid not entirely filling the tube and leaving a bubble therein, said bubble providing an indicating means in conjunction with appropriate scales which is effective and efficient for measuring an inclined, angular or arcuate surface.

Another important object of the invention is to provide a form measuring device which is of simple construction and which, because of the absence of many mechanical elements, is less susceptible to the development of defects than mechanical devices heretofore employed.

Other important objects and advantages of the invention will become apparent to the reader of the following specification.

Figure 1:
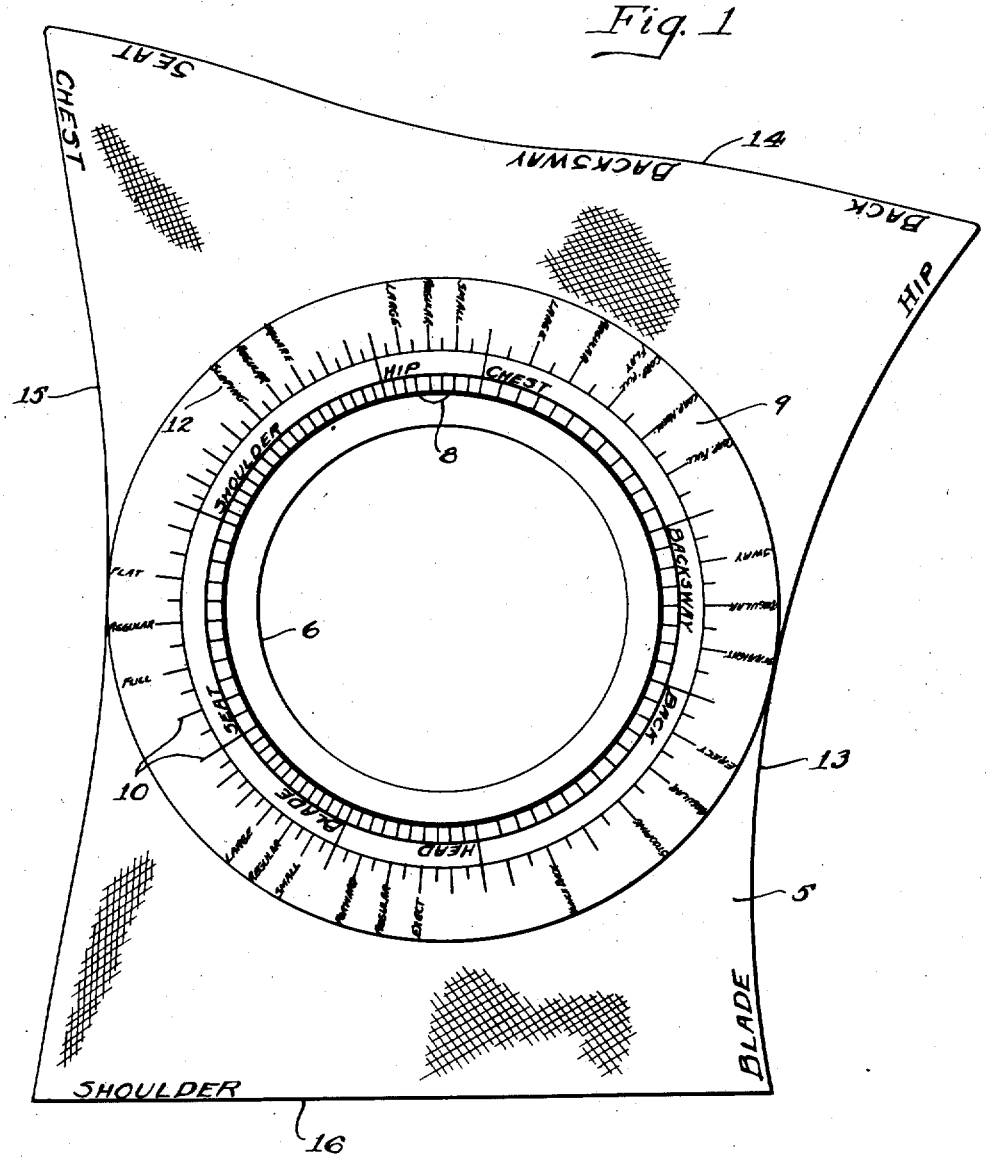
Fig. 1 represents an elevational view of one form of the said invention having an annular bubble glass, this particular form, when used in conjunction with the various irregularly curved sides indicated, is adapted to measured any desired body contour.

In that form of the device shown in Fig. 1 the numeral 5 indicates a sheet of relatively stiff material forming a body and having a circular central aperture therein in which is mounted the annular transparent tube 6, in which bubble 8 floats freely in a liquid indicated by the numeral 7.

The numeral 9 indicates a circular printed or disc portion which may be attached to, printed on or formed integral with the main body portion 5, the same being marked off by appropriate radially extending markings or indicia indicated by the numeral 10. Further and other verbal indicia or marks 12 may be disposed about the annular portion 9, bearing indicating markings adapted to particularly illustrate and indicate in approximately descriptive language the characteristics of the contour or degree of curvature of any particular part of the human body, proper measurement of which is essential to the fabrication of properly fitting clothing.

Figure 2:
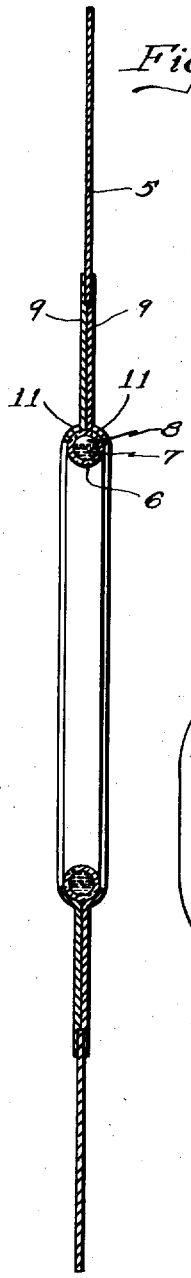
Fig. 2 represents a cross sectional view through the structure shown in Fig. 1.
Figure 5:
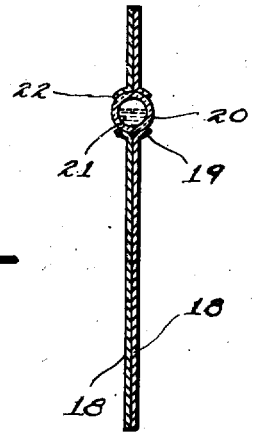
Fig. 5 is a view in cross section taken on the line 5—5 of Fig. 3 and particularly illustrating one means of mounting the arcuately disposed bubble glass in the main body portion.
Figure 4:
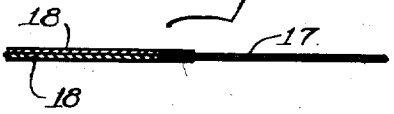
Fig. 4 is a fragmentary sectional view taken on the line 4—4 of Fig. 3 showing the relative position of the body portions which are preferably used in that form shown in Fig. 3 when said portions are not folded as shown in Figs. 8 and 9.

The circular portion 9 in preferred form has a pair of annular outwardly extending lips or annular retaining means, indicated by numeral 11, as shown in Fig. 2, over-extending the annular tube 6 and serving to retain the tube 6 in fixed and appropriate position in the plane of the body portion 5.

As further shown in Fig. 1 the body portion 5 is provided with the irregularly curved edge portions 13, 14 and 15 and one relatively straight edge portion 16.

The irregularly curved edge 13 is adapted to conform generally to the conventional curvatures of the human hip when placed thereagainst in its one perpendicular position, and to that of the shoulder blade when turned in opposite perpendicular position, so that the edge of body 5, opposite to that aforementioned, is uppermost.

The irregularly curved edge 14 is so formed as to conform substantially in its various reversed portions, as indicated in Fig. 1, to the human back, backsway and seat contours or indentions, when placed thereagainst.

The irregularly curved edge 15 is formed to conform substantially to the conventional chest contour, and the relatively straight edge portion 16 is adapted to be placed against and to aid in measuring the shoulder contour.

It will be obvious from the drawings that the indicia 10 and 12 on chart 9 are so disposed about annular tube 6 that bubble 8, always being at the top of tube 6, will fall into substantially correct registry with appropriate indicia when any of the edge portions 13, 14, 15 and 16 are placed against the corresponding portion of the body for the measurement of which each edge is specially designed.

It is important for accurate inclination and curvature readings that the main body portion in which the tube is arcuately mounted be in substantially perpendicular position to the body surface, the indention of which is being measured. In such position the end edge is placeable, for instance, against the neck with the portion 16a flat against the back or shoulders in order to measure the relative indention of the neck, or the relative position of the collar of a coat with respect to the back or shoulder blades. This projecting portion provides means for effectively measuring any particular surface and especially a rounded, an arcuate or angular surface.

Figure 3:
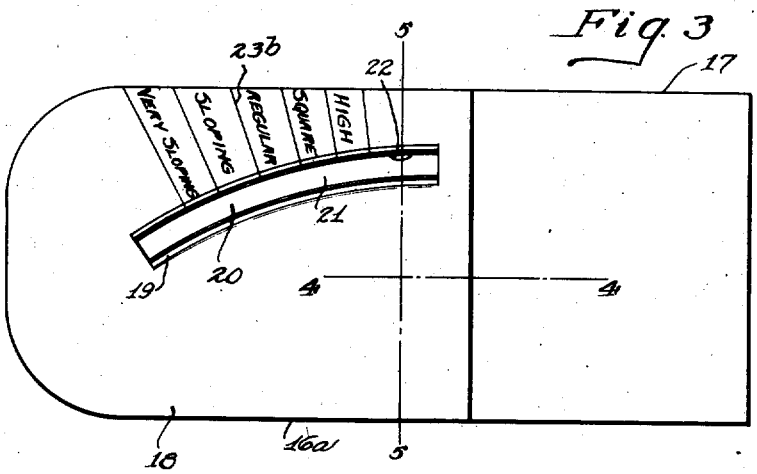
Fig. 3 is an elevational view of a modified form of the device, this being a singular device, particularly adapted to be used to measure the slope of the shoulders.

Shown in Fig. 3 is a modified form of the device particularly adapted for measuring the shoulders and this consists of a relatively flat base portion 17 which may be formed integral with, or otherwise suitably secured to the main body portion 18, and, when in the same plane as the body portion 18 appearing substantially as shown in Fig. 3.

As shown in Fig. 3, body portion 18 has an arcuately disposed aperture or slot therein, and is provided with holding elements or lips 19, substantially as shown, for the liquid tube 20, which tube contains a quantity of liquid 21 sufficient to form a freely moving bubble 22. Measuring details in the form of indicia 23 may be placed on the outer sides of body portion 18 in relatively close proximity to arcuate tube 20 so that the relative position of bubble 22 and indicia 23 will determine and indicate the type of shoulder formation being measured.

Figure 6:
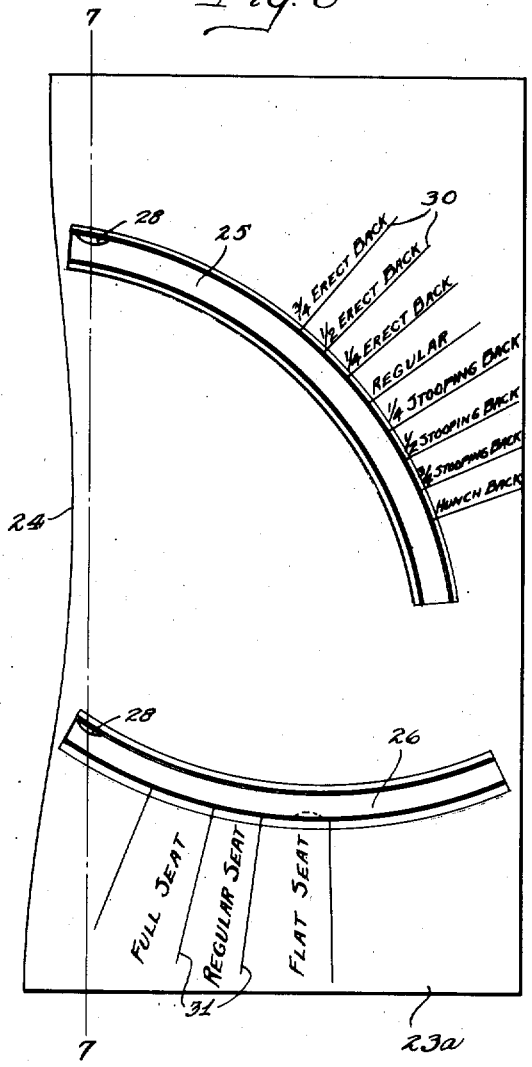
Fig. 6 is an elevational view of a combination form of the device particularly adapted to measure the form of the back and seat.

Fig. 6 particularly illustrates a further modified form of the device being substantially a combination of that general form shown in Fig. 3 but being particularly adapted for measuring the human back and the seat portion. The device disclosed in Fig. 6 consists of a body portion 23a having two arcuate apertures, with two spaced apart bubble tubes or glasses 25 and 26 therein. The numeral 25 represents that bubble glass or gauge tube particularly adapted for measuring the back, while numeral 26 represents that gauge tube adapted to measure the seat. Each of these tubes contains a liquid 27 shown in Fig. 7 and the indicating bubbles indicated by the numeral 28 float therein.

Figure 7:
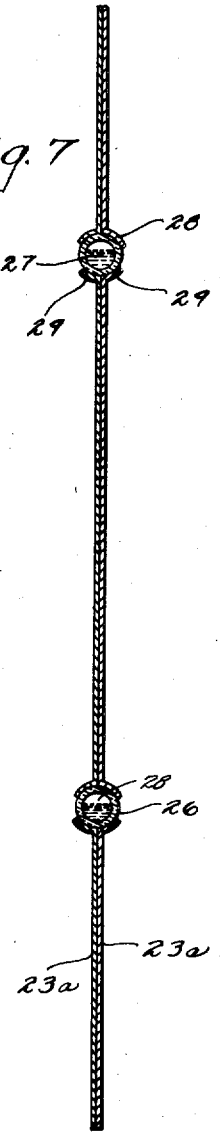
Fig. 7 is a cross sectional view taken substantially on line 7—7 of Fig. 6 showing the disposition of the pair of bubble tubes and means for retaining said tubes in proper position in the body portion.

In preferred form, the body portion 23a is formed of a pair of sheets fastened together to form a body member, as shown in Fig. 7, and which sheets also have, in preferred form, the outwardly protruding flanges or lips 29 serving to retain the bubble or gauge glasses 25 and 26 respectively in their proper positions in the main body portion 23a. This retaining means is merely used as an illustration and obviously said bubble gauge glasses or tubes may be mounted in the body by any equivalent means.

Detailed readings in the form of indicia 30 and 31, as shown on the drawings, are placed in relatively close and appropriate position adjacent tubes 25 and 26 respectively.

That form particularly illustrated in Fig. 6 has one irregularly curved edge 24, and has the tubes 25 and 26 placed in spaced relation and are curved in opposite directions, as shown, such that the curvature indicia and bubble co-acting with each tube will fall into appropriate registry when the perpendicular position of the device is reversed to opposite perpendicular position for the various measurement purposes indicated.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. A body form measuring device comprising a sheet having a double ply portion and one or more irregularly curved body engaging edges, said plies having registering openings therethrough, a bubble glass disposed in the openings, the edge portions of the said plies, engaging and retaining the said bubble glass, and a scale in spaced relation to said bubble glass whereby the formation of the body portion engaged by the body engaging edge of the sheet can be measured.

2. A body form measuring device comprising a sheet having a double ply portion, said portion being provided with a body engaging edge, said plies having registering openings therethrough, a bubble glass disposed in the openings, the edge portions of said plies, at the openings, being flared outwardly for engaging and retaining the said bubble glass, and a scale in spaced relation to said bubble glass whereby the formation of the body portion engaged by the body engaging edge of the sheet can be measured.

3. In a device for measuring the curvature of portions of the human body the combination of a substantially flat body member having one or more irregularly curved edges and having a circular substantially centrally disposed aperture therein, an annular tube containing a liquid and a floating bubble in said liquid, annular shoulders integral with said body member in spaced relation to one another on both edges of said circular aperture therein and overextending the annular tube and retaining said tube in said aperture in said body, and body measurement indicia adjacent said tube and in annular spaced relation thereto, substantially as set forth.

EMIL E. KOE.